May 5, 1936.  R. J. BUSH  2,039,701
BRAKE CONTROLLING MEANS
Filed Dec. 1, 1934  2 Sheets-Sheet 2
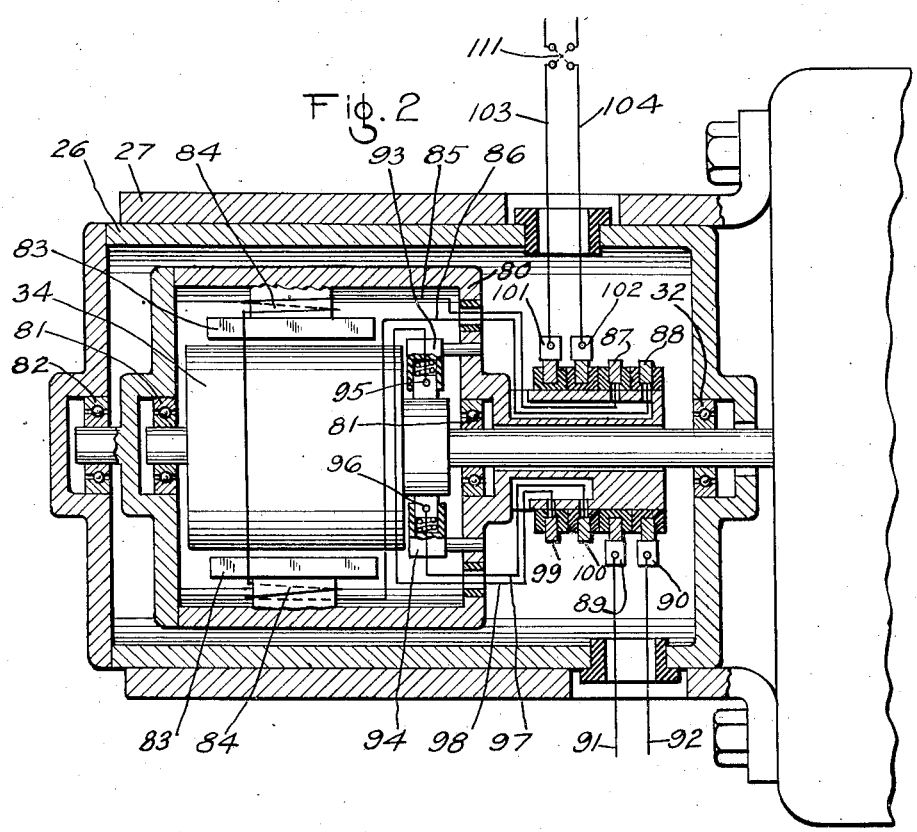
INVENTOR
RANKIN J. BUSH
BY *Wm. H. Cady*
ATTORNEY Patented May 5, 1936

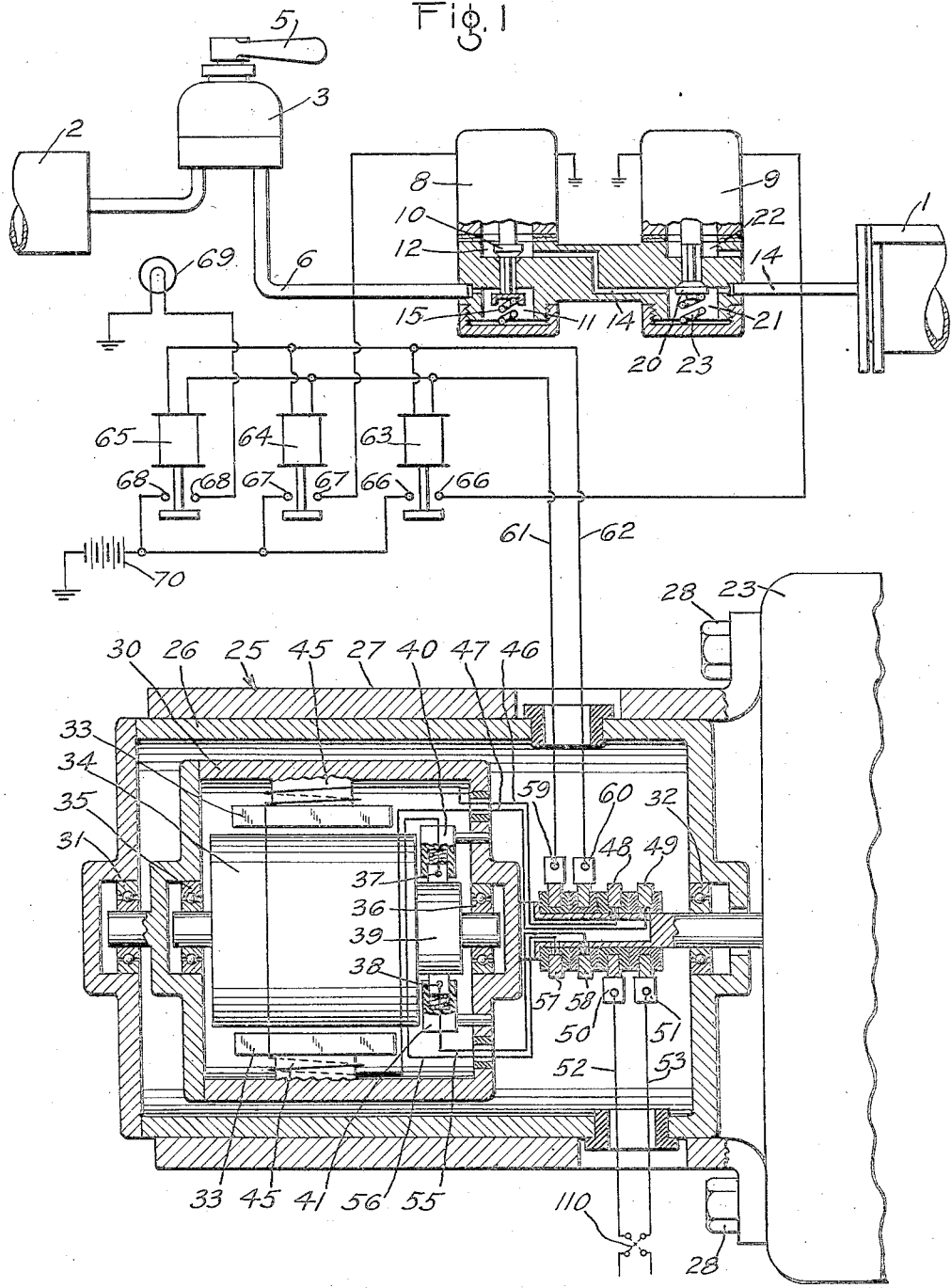

2,039,701

UNITED STATES PATENT OFFICE 2,039,701

BRAKE CONTROLLING MEANS

Rankin J. Bush, Jeannette, Pa., assignor to The Westinghouse Air Brake Company, Wilmerding, Pa., a corporation of Pennsylvania Application December 1, 1934, Serial No. 755,603

22 Claims. (Cl. 303—21)

This invention relates to brake controlling means and more particularly to a brake controlling means which is operative in response to changes in the rate of speed of the vehicle wheels.

It is well known that for a given braking pressure friction type brakes are less effective in retarding the motion of a vehicle at high speeds than at low speeds because the coefficient of friction between the rubbing parts is lower at high speeds than at low speeds. In order to bring a vehicle to a stop quickly it has been the usual practice for an operator to apply the brakes with a high degree of braking pressure at high speeds, and, as the speed of the vehicle decreases, to so operate the brakes as to cause the braking pressure to decrease in such manner that the vehicle is brought to a stop quickly and smoothly without dangerous shock or skidding of the wheels. However, it is difficult to manually control the braking forces so as to properly reduce the braking pressure, and it is desirable, therefore, to provide as a part of the equipment of the vehicle some means for automatically reducing the braking pressure as the speed of the vehicle decreases.

It has also been found that in starting some types of vehicles, the operator will supply too much current to the driving motors with the result that the wheels spin. It is desirable, therefore, to provide means responsive to an increase in the rate of rotation of the wheels and which will operate a signal device to warn the operator of the vehicle of this condition.

It is a principal object of my invention to provide means to control the rate of retardation of the vehicle.

Another object of my invention is to provide means to control the degree of application of the brakes responsive to the rate of retardation of the vehicle.

A further object of my invention is to provide means to control the degree of application of the brakes so that the rate of retardation of the wheels will not exceed a predetermined value.

Another object of my invention is to provide means responsive to the rate of change of speed of the wheels of the vehicle and operable to control the degree of application of the brakes.

A further object of my invention is to provide means responsive to the rate of change of the speed of the wheels of the vehicle and having a signal device associated therewith and operable in response to an increase in the speed of the wheels in excess of a predetermined value.

Another object of my invention is to provide means to control the degree of application of the brakes responsive to the rate of retardation of the vehicle, said means being operable in either direction of movement of the vehicle and having means to selectively control the direction of movement of the vehicle to which the means is responsive.

Other objects of the invention and features of novelty will be apparent from the following description taken in connection with the accompanying drawings in which Figure 1 is a diagrammatic view of circuits and apparatus illustrating one preferred embodiment of the invention, parts of the apparatus being broken away and shown in section so as to more clearly reveal other parts; and Figure 2 is a sectional view showing a modified form of apparatus which I may employ.

Referring to the drawings and more particularly to Figure 1 thereof, the numeral 1 indicates the brake cylinder of a fluid pressure brake that is supplied with fluid under pressure from a reservoir 2 by the operation of the brake valve 3 upon movement of the brake valve handle 5 to an application position in a well known manner. Fluid under pressure is also released from the brake cylinder 1 through the brake cylinder pipe 6 and ports and passages in the brake valve 3 upon movement of the handle 5 to the release position.

A pair of magnet valve devices 8 and 9 are interposed in the brake cylinder pipe 6 between the brake valve 3 and the brake cylinder 1. The cut-off magnet valve device 8 is provided with a winding operatively associated with a valve 10 that is effective to control communication between the inlet chamber 11, to which fluid under pressure is supplied through the supply pipe 6 leading from the brake valve 3, and the outlet chamber 12, from which fluid under pressure flows through the passage and pipe 14 to the brake cylinder. A spring 15 is provided in the inlet chamber for biasing the valve 10 to its upper or open position to effect communication between the inlet chamber 11 and outlet chamber 12. The valve 10 moves downwardly to its closed position when the winding of the valve is energized.

The release valve device 9 is interposed in the passage 14 between the cut-off valve device 8 and the brake cylinder and is generally similar in construction to the magnet valve device 8, having a winding operatively associated with a valve 20 which controls the communication between the chamber 21, which communicates with the brake cylinder, and the chamber 22 which communicates with the atmosphere. A spring 23 is provided in the chamber 21 and urges the valve 20 to its upper or seated position to close communication between the chamber 21 and the chamber 22. The valve is moved to the open position when the winding of the magnet valve device is energized, thereby allowing fluid under pressure to escape from the brake cylinder to the atmosphere through the chamber 22.

An electrical differential device indicated generally by the reference character 25 is provided for controlling the operation of the magnet valve devices 8 and 9, and, as shown in the drawings, comprises an electric generator which may be mounted in any suitable place on the vehicle and which has one of its elements driven in accordance with the speed of the wheels of the vehicle. I have illustrated the generator mounted on the end of one of the driving motors, a generator element being driven from the armature shaft of the motor.

As shown in the drawings, the generator comprises a housing 26 which is supported in a bracket 27 which is secured to the end of the driving motor 23 in any suitable manner, as by means of bolts 28. A second housing, indicated at 30, is rotatably supported in the housing 26 on anti-friction bearings 31 and 32. The housing 30 carries the field poles 33 which are constructed of magnetic material, and also has the armature 34 rotatably supported within it on anti-friction bearings 35 and 36. The brushes 37 and 38 for the commutator 39 of the armature 34 are carried in brush holders 40 and 41 which are also mounted on the housing 30.

The field poles 33 are each provided with a field winding 45 and the wires 46 and 47 leading from the field windings are carried out through the housing 30 to the collector rings 48 and 49 which are mounted on and insulated from a reduced portion of the housing 30, and which are engaged by brushes 50 and 51 to which are connected the wires 52 and 53 leading from any suitable source of electric current by which the field is energized or excited. Similarly the wires 55 and 56 leading from the brushes 37 and 38 for the commutator 39 are carried out through an opening in the housing 30 to the collector rings 57 and 58 mounted on an extension of the housing 30 and insulated therefrom and which are engaged by the brushes 59 and 60 to which are connected the wires 61 and 62 leading to the directional relays 63, 64, and 65.

The relays 63, 64, and 65 may be of any well known construction and are responsive to the direction of flow of current through the conductors 61 and 62, the relays 63 and 64 being arranged to close the contacts controlled thereby when energized by a flow of current of one polarity, while the relay 65 is constructed to close contacts controlled by it when energized by current of a polarity opposite to that which is effective to operate the relays 63 and 64.

The relay 63 controls the contacts 66 which control a circuit leading from the battery 70 or other suitable source of electric current to the winding of the magnet valve device 9. One side of the battery is grounded while the other side of the winding of the magnet valve device is also grounded so that when a circuit is established between the contacts 66, a circuit is completed through the winding of the magnet valve device so as to open the valve 20 and permit fluid under pressure to escape from the valve chamber 21 and the brake cylinder 1 to the chamber 22 and therefrom to the atmosphere.

The relay 64 controls the contacts 67 in the circuit leading to the winding of the magnet valve device 8, the opposite terminal of the winding of the magnet valve device being grounded so that when a circuit is established between the contacts 67 current will flow through the winding of the magnet valve device from the battery 70, thereby moving the valve 10 downwardly to its closed position, and cutting off the communication by which fluid under pressure flows from the brake pipe 6 to the brake cylinder 1.

The relays 63 and 64 are constructed so as to be operable responsive to different current values. The relay 64 which controls the circuit to the magnet valve 8 is constructed so as to be operable in response to a current of smaller value than the relay 63 which controls the circuit to the magnet valve 9.

The relay 65, which is constructed so as to be operable responsive to a flow of current in a direction opposite to that which operates the relays 63 and 64, controls the contacts 68 in the circuit leading to any suitable signaling means such as a lamp 69. The other side of this circuit is connected to ground, and, as will be understood, when a circuit is established between the contacts 68 current will flow from the battery to the lamp and light the lamp.

The relays 63, 64, and 65 are designed so that they will consume a small amount of current without operating, but so that on an increase in the amount of current supplied by the generator they will operate.

In operation the housing 30 carrying the field poles 33 of the electrical differential device or generator is driven by the driving motor of the vehicle in accordance with the speed of rotation of the vehicle wheels. The field windings 45 surrounding the pole pieces 33 are energized by the current supplied through the conductors 52 and 53 and the magnetic attraction of the pole pieces for the armature 34 is sufficient to cause the armature, which is freely rotatable relative to the housing 30, to rotate with the housing 30 and at substantially the same speed. Nearly synchronous speed of the housing 30 and the armature 34 is assured during normal rotation of the housing 30 by the driving motor by the fact that the relays 63, 64, and 65 are designed to lightly load the armature in case of a small amount of slip or relative movement between the armature and the housing 30 carrying the field poles.

When the rate of rotation of the wheels of the vehicle is reduced, as when the brakes are applied by the admission of air from the reservoir 2 to the brake cylinder 1 by operation of the handle 5 of the brake valve 3, the housing 30 carrying the field portion of the generator will be reduced in speed. The armature 34, being freely rotatable relative to the housing 30, will continue to rotate at substantially the speed at which it has been rotating because of its inertia, with the result that there will be relative movement between the armature 34 and field poles 33 and a current will be generated which will flow through the wires 55 and 56 to the collector rings 57 and 58 and then to the conductors 61 and 62.

The amount of relative movement between the generator elements is responsive to the rate of change in the speed of the driven element of the generator. If the driven element is reduced in speed, the other element, because of its inertia, will continue to rotate and will over-run the first element, thus producing relative movement between the generator elements and causing a current to be generated. The amount of relative movement between the generator elements and hence the strength of the current generated, however, is dependent on the amount of reduction in the speed of the driven member.

Similarly if the driven element is increased in speed very rapidly, the other element, because of its inertia, will tend to remain stationary thereby producing relative movement between the generator elements.

If, as a result of a reduction in the speed of the vehicle due to the application of the brakes, the generator is caused to generate a small amount of current above a low predetermined value, below which the relays are insufficiently energized to operate, the relay 64 will operate to complete a circuit between the contacts 67, thus energizing the winding of the cut-off magnet valve 8, causing the valve 10 to close and cut off the flow of fluid to the brake cylinder.

If a relatively large amount of current is supplied, as when the rate of reduction of the speed of the vehicle wheels is relatively high so that relatively great movement is effected between the armature 34 and the pole pieces 33, the relay 63 will also be caused to operate, completing the circuit between the contacts 66, thereby establishing a circuit through the winding of the release magnet valve 9 and causing this valve to operate to move the valve 20 downwardly, thus opening the communication by which fluid under pressure is released from the brake cylinder 1. This releases the brakes and reduces the rate at which the vehicle wheels decelerate.

As the rate of deceleration of the wheels decreases there will be less relative movement between the armature 34 and the pole pieces 33, and a smaller amount of current will be generated, with the result that the release magnet valve 9 will be deenergized due to the opening of the relay 63 in response to the reduction in the current supplied to it by the generator. When the magnet valve 9 is deenergized, the valve controlled by it will be closed and the release of fluid from the brake cylinder will be cut off.

If the release of fluid under pressure from the brake cylinder is greater than necessary and a further reduction in the rate of deceleration of the vehicle wheels results, there will be a further reduction in the amount of relative movement between the armature 34 and the pole pieces 33 with a corresponding reduction in the amount of current generated by the generator, and, when this current falls to a predetermined low value, the relay 64 will operate to open the circuit between the contacts 67 and thereby interrupt the flow of current to the winding of the magnet valve device 8, thus deenergizing this winding and allowing the valve 10 to open, thereby opening the communication between the reservoir 2 and the brake cylinder 1, providing the brake valve handle 5 has remained in its brake applying position. This will again permit fluid to flow to the brake cylinder and increase the pressure in the brake cylinder, thus increasing the degree of application of the brakes and accordingly increasing the rate of deceleration of the vehicle. However, in the event that the rate of deceleration again increases to too great a value the generator will again generate current to operate the relays 63 and 64 to either cut off the flow of fluid to the brake cylinder or permit the release of a portion of the fluid in the brake cylinder, thus releasing the brakes and reducing the rate of deceleration of the vehicle.

It has been found in the operation of certain types of vehicles that there is danger of wheel slippage in the event that too great a supply of current is supplied to the motors of the driving wheels when the wheels are used as driving agencies and that this causes the wheels to slip or turn freely without moving the vehicle. It is desirable to have signaling means to inform the operator of such condition and the means provided by my invention is adapted to operate such a signal. This means will now be described.

When too great an amount of current is supplied to the driving motors of the vehicle with the result that the wheels slip the rate of acceleration of the wheels is very high, the rate of acceleration of the housing 30 carrying the pole pieces of the generator will be very high also, as it is driven according to the speed of the wheels. The armature 34, however, being freely rotatable relative to the housing 30 and being subject to inertia will tend to remain stationary and there will be relative movement between the pole pieces 33 and the armature 34, and in a direction opposite to that produced by a reduction in the rate of rotation of the vehicle wheels. The relative movement between the pole pieces and the armature in this direction results in the generation of a current of a polarity opposite to that which is generated when there is a rapid reduction in the speed of the vehicle wheels. Current of this polarity does not affect the relays 63 and 64, but it is effective to operate the relay 65, causing this relay to complete a circuit between the contacts 68 thereby allowing current to flow from the battery 70 to the signaling device 69 to signal the operator that the wheels are slipping. As soon as the rate of acceleration of the wheels decreases, either because of a redutcion in the amount of current supplied to the driving motors or for other reasons, there will be less relative movement between the armature 34 and the pole pieces with the result that a smaller amount of current will be generated. and the relay 65 will operate to open the circuit between the contacts 68 and deenergize the signaling means.

I have shown in Figure 2 a modified form of electrical differential device or generator which I may employ. This generator differs from that shown in Figure 1 in that the armature of this generator is driven in accordance with the speed of the vehicle wheels, while the field pole pieces are freely movable relative to the armature and are controlled by inertia. As shown in the drawings there is a supporting bracket 27 similar to that employed in connection with the generator shown in Figure 1 and the generator housing 26 is supported by this bracket. The armature 34 is mounted on an extension of the driving motor shaft which is rotatably supported in the housing 26 by the anti-friction bearing 32. A housing, indicated at 80, is rotatably mounted on the shaft on which the armature is mounted by means of anti-friction bearings 81, while a reduced portion on one end of the housing is supported by the bearing 82 which is mounted in the end of the generator housing 26. The generator housing 80 has the field pole pieces 83 mounted thereon. The pole pieces have suitable field windings 84 having wires 85 and 86 leading therefrom and connected to contact rings 87 and 88 which are mounted on, but insulated from, a reduced portion of the housing 80 and which are engaged by the brushes 89 and 90 to which are connected wires 91 and 92 leading from any suitable source of current by which the field winding may be energized or excited. The housing 80 has brush holders 93 and 94 mounted thereon and carrying brushes 95 and 96 engaging the commutator on the armature 34 and having wires 97 and 98 leading to the contact rings 99 and 100 mounted on, but insulated from, a reduced portion of the housing 80, and which are engaged by brushes 101 and 102 to which are connected the wires 103 and 104 which correspond to the wires 61 and 62 in the form of device shown in Figure 1, and which lead to the relays which are energized by the current generated by the generator.

The operation of this form of electrical differential device or generator is similar to that of the form shown in Figure 1. In this form of the generator the armature 34 is rotated in accordance with the speed of rotation of the vehicle wheel and the field pole pieces mounted on the housing 80, which is freely rotatable relative to the armature 34, are caused to rotate with the armature 34 because of the magnetic attraction of the pole pieces and the armature. In the event of a sudden change in the rate of rotation of the vehicle wheels, however, the speed of rotation of the armature 34 will be changed, but the inertia of the pole pieces 83 and the housing 80 will prevent the field portion of the generator from responding instantaneously to the changes in the speed of the armature, with the result that there will be relative movement between these generator portions and a current will be generated as a result of this relative movement. The system provided by this invention is adapted for use on vehicles which are operated in both directions, as well as for use on vehicles which are operated in a forward direction only. Where the vehicle is to be operated in both directions it is necessary to provide means to reverse the polarity of the current supplied to the relays by the generator as the current produced by the generator as a result of retardation of the vehicle when operating in one direction is of one polarity, while the current produced by the generator as a result of retardation of the vehicle when operating in the other direction is of the opposite polarity. This is due to the fact that the relative movement between the generator elements is in opposite directions in these cases.

As the relays 63, 64, and 65 are operable responsive to a flow of current of one polarity only, it is necessary to provide means to selectively control the polarity of the current supplied to these relays. This may be accomplished in either of two ways. Thus a reversing switch 110 may be interposed in the circuits leading to the field windings so that the current in the field windings may be reversed when desired. This will reverse the polarity of the generator output. In place of the switch in the circuit to the field, a reversing switch 111 may be interposed in the circuit leading from the generator to the relays so that the polarity of the current supplied to the relays may be selectively reversed although the polarity of the current supplied by the generator remains unchanged. By operating the switches in accordance with the direction of movement of the vehicle, the polarity of the current supplied to the relays can be controlled so that they will be operable to control movement of the vehicle in either direction.

It will be apparent from the foregoing description that I have provided means responsive to the rate of change of speed of the vehicle wheels to control application of the brakes, either by cutting off the flow of fluid under pressure to the brake cylinder, or by releasing fluid from the brake cylinder, or both, and this means is operable so as to control the application of the brakes in a manner to prevent the rate of deceleration of the vehicle wheels exceeding a predetermined value.

It will be seen also that my invention provides means operable responsive to changes in the speed of the vehicle wheels and that it has a signal device associated therewith and operable responsive to an increase in the speed of the wheels in excess of a predetermined rate so that the operator of the vehicle will be warned of wheel slipping caused by too great a supply of current to the driving motors.

While I have illustrated and described one preferred embodiment of my invention and a modified form of electrical differential device or generator which I may employ, it should be understood that the invention is not limited to these details of construction and that numerous changes and modifications can be made without departing from the scope of the following claims.

Having now described my invention, what I claim as new and desire to secure by Letters Patent, is:

1. In a brake equipment for vehicles, in combination, a brake cylinder, means for supplying fluid under pressure to said brake cylinder to apply the brakes, an electrical differential device comprising a pair of relatively movable elements and adapted to generate a current on movement of said elements relative to each other, one of said elements being driven in accordance with the speed of a vehicle wheel, the other of said elements being movable with the first element, said second element being responsive to inertia whereby said first and second elements are movable relative to each other in response to changes in the speed of the first element, and means responsive to current produced by relative movement of said elements for controlling the pressure of the fluid in the brake cylinder.

2. In a brake equipment for vehicles, in combination, a brake cylinder, means for supplying fluid under pressure to said brake cylinder to apply the brakes, an electrical differential device comprising a pair of relatively movable elements and adapted to generate a current on movement of said elements relative to each other, one of said elements being driven in accordance with the speed of a vehicle wheel, the other of said elements being movable with the first element, the elements being movable relative to each other in response to changes in the speed of one of said elements, and means responsive to current produced by relative movement of said elements for controlling the pressure of the fluid in the brake cylinder.

3. In a brake equipment for vehicles, in combination, a brake cylinder, means for supplying fluid under pressure to said brake cylinder to apply the brakes, an electrical differential device comprising a pair of relatively movable elements and adapted to generate a current on movement of said elements relative to each other, one of said elements being driven in accordance with the speed of a vehicle wheel, the other of said elements being movable with the first element, the elements being movable relative to each other in response to changes in the speed of one of said elements, and means responsive to current produced by relative movement of said elements for controlling the communication through which fluid under pressure is supplied to the brake cylinder.

4. In a brake equipment for vehicles, in combination, a brake cylinder, means for supplying fluid under pressure to said brake cylinder to apply the brakes, an electrical differential device comprising a pair of relatively rotatable elements and adapted to generate a current on movement of said elements relative to each other, one of said elements being rotated in accordance with the speed of a vehicle wheel, the other of said elements being rotatable with the first element, said second element being responsive to inertia whereby said first and second elements are rotatable relative to each other in response to changes in the speed of the first element, and means responsive to current produced by relative rotation of said elements for controlling the pressure of the fluid in the brake cylinder.

5. In a brake equipment for vehicles, in combination, a brake cylinder, means for supplying fluid under pressure to said brake cylinder to apply the brakes, a communication through which fluid is released from the brake cylinder, an electrical differential device comprising a pair of relatively movable elements and adapted to generate a current on movement of said elements relative to each other, one of said elements being driven in accordance with the speed of a vehicle, the other of said elements being movable with the first element, said elements being movable relative to each other in response to changes in the speed of one of said elements, and means responsive to current produced by relative movement of said elements for controlling the communication through which fluid under pressure is released from the brake cylinder.

6. In a brake equipment for vehicles, in combination, a brake cylinder, means for supplying fluid under pressure to said brake cylinder to apply the brakes, a communication through which fluid is released from the brake cylinder, an electrical differential device comprising a pair of relatively movable elements, one of said elements being driven in accordance with the speed of a vehicle, the other of said elements being movable with the first element, said elements being movable relative to each other in response to changes in the speed of one of said elements, means for controlling the communication through which fluid under pressure is supplied to the brake cylinder, and means for controlling the communication through which fluid under pressure is released from the brake cylinder, each of said means being operable in response to movement of the elements of the electrical differential device relative to each other, one of said means being operable in response to a lesser amount of movement of said elements relative to each other than the other of said means.

7. In a brake equipment for vehicles, in combination, a brake cylinder, means for supplying fluid under pressure to said brake cylinder to apply the brakes, a communication through which fluid is released from the brake cylinder, an electrical differential device comprising a pair of relatively movable elements, one of said elements being driven in accordance with the speed of a vehicle, the other of said elements being movable with the first element, said elements being movable relative to each other in response to changes in the speed of one of said elements, means for controlling the communication through which fluid under pressure is supplied to the brake cylinder, and means for controlling the communication through which fluid under pressure is released from the brake cylinder, each of said means being operable in response to movement of the elements of the electrical differential device relative to each other, the means for controlling the communication through which fluid under pressure is supplied to the brake cylinder being operable in response to a lesser amount of movement of said elements relative to each other than the other of said means.

8. In a brake equipment for vehicles, in combination, a brake cylinder, means for supplying fluid under pressure to said brake cylinder to apply the brakes, an electrical differential device comprising a pair of relatively movable elements, one of said elements being driven in accordance with the speed of a vehicle wheel, the other of said elements being movable with the first element, the elements being movable relative to each other in response to changes in the speed of one of said elements, the electrical differential device being operable in response to relative movement of its elements in one direction to generate a current of a given polarity and being operable in response to relative movement of its elements in the opposite direction to generate a current of the opposite polarity, and electro-responsive means for controlling the communication through which fluid under pressure is supplied to the brake cylinder, said means being operable in response to current of one polarity supplied by the electrical differential device and being inoperative in response to current of the opposite polarity.

9. In a brake equipment for vehicles, in combination, a brake cylinder, means for supplying fluid under pressure to said brake cylinder to apply the brakes, an electrical differential device comprising a pair of relatively movable elements, one of said elements being driven in accordance with the speed of a vehicle wheel, the other of said elements being movable with the first element, the elements being movable relative to each other in response to changes in the speed of one of said elements, the electrical differential device being operable in response to relative movement of its elements in one direction to generate a current of a given polarity and being operable in response to relative movement of its elements in the opposite direction to generate a current of the opposite polarity, and electro-responsive means for controlling the pressure of the fluid in the brake cylinder, said means being operable in response to current of one polarity supplied by the electrical differential device and being inoperable in response to current of the opposite polarity.

10. In a brake equipment for vehicles, in combination, a brake cylinder, means for supplying fluid under pressure to said brake cylinder to apply the brakes, an electrical differential device comprising a pair of relatively movable elements and adapted to generate a current on movement of said elements relative to each other, one of said elements being driven in accordance with the speed of a vehicle wheel, the other of said elements being movable with the first element, the elements being movable relative to each other in response to changes in the speed of one of said elements, and means operable in response to current produced by relative movement of said elements effected by a reduction in the speed of the element driven in accordance with the speed of a vehicle wheel to control the pressure of the fluid in the brake cylinder.

11. In a brake equipment for vehicles, in combination, a brake cylinder, means for supplying fluid under pressure to said brake cylinder to apply the brakes, a communication through which fluid is released from the brake cylinder, an electrical differential device comprising a pair of relatively movable elements and adapted to generate a current on movement of said elements relative to each other, one of said elements being driven in accordance with the speed of a vehicle wheel, the other of said elements being movable with the first element, said elements being movable relative to each other in response to changes in the speed of one of said elements, and means operable in response to current produced by relative movement of said elements effected by a reduction in the speed of the element driven in accordance with the speed of a vehicle wheel to control the communication through which fluid under pressure is released from the brake cylinder.

12. In a brake equipment for vehicles, in combination, a brake cylinder, means for supplying fluid under pressure to said brake cylinder to apply the brakes, a communication through which fluid is released from the brake cylinder, an electrical differential device comprising a pair of relatively movable elements and adapted to generate a current on movement of said elements relative to each other, one of said elements being driven in accordance with the speed of a vehicle wheel, the other of said elements being movable with the first element, said elements being movable relative to each other in response to changes in the speed of one of said elements, and means operable in response to current produced by relative movement of said elements effected by a reduction in the speed of the element driven in accordance with the speed of a vehicle wheel to control the communication through which fluid under pressure is supplied to the brake cylinder.

13. In a brake equipment for vehicles, in combination, a brake cylinder, means for supplying fluid under pressure to said brake cylinder to apply the brakes, an electrical differential device comprising a pair of relatively movable elements, one of said elements being driven in accordance with the speed of a vehicle wheel, the other of said elements being movable with the first element, the elements being movable relative to each other in response to changes in the speed of one of said elements, the electrical differential means being operable in response to relative movement of its elements effected by a reduction in the speed of the element driven in accordance with the speed of the vehicle wheel to generate a current of a given polarity, and being operable in response to relative movement of its elements effected by an increase in the speed of the element driven in accordance with the speed of the vehicle wheel to generate a current of the opposite polarity, and electro-responsive means for controlling the pressure of the fluid in the brake cylinder, said means being operable in response to current of one polarity supplied by the electrical differential device and being inoperable in response to current of the opposite polarity.

14. In a brake equipment for vehicles, in combination, a brake cylinder, means for supplying fluid under pressure to said brake cylinder to apply the brakes; an electrical differential device comprising a pair of relatively movable elements, one of said elements being driven in accordance with the speed of a vehicle wheel, the other of said elements being movable with the first element, the elements being movable relative to each other in response to changes in the speed of one of said elements, the electrical differential device being operable in response to relative movement of its elements in one direction to generate a current of a given polarity and being operable in response to relative movement of its elements in the opposite direction to generate a current of the opposite polarity, electro-responsive means for controlling the pressure of the fluid in the brake cylinder, said means being operable in response to current of one polarity supplied by the electrical differential device and being inoperable in response to current of the opposite polarity, and manually controlled means for controlling the polarity of the current supplied to said electro-responsive means whereby said means may be selectively controlled to be responsive to relative movement of the elements of the electrical differential device in either direction.

15. In a device of the class described, an electrical differential device comprising a pair of relatively movable elements, one of said elements being driven in accordance with the speed of a vehicle wheel, the other of said elements being movable with the first element, the elements being movable relative to each other in response to changes in the speed of one of said elements, and means operable in response to relative movement of said elements effected by an increase in the speed in the element driven in accordance with the speed of the vehicle to control a signaling device.

16. In a device of the class described, a brake cylinder, means for supplying fluid under pressure to said brake cylinder to apply the brakes, an electrical differential device comprising a pair of relatively movable elements, one of said elements being driven in accordance with the speed of a vehicle wheel, the other of said elements being movable with the first element, said elements being movable relative to each other in response to changes in the speed of one of said elements, means operable in response to relative movement of said elements in one direction and controlling the pressure of the fluid in the brake cylinder, and signaling means operable in response to relative movement of said elements in the opposite direction.

17. In a brake equipment for vehicles, in combination, a brake cylinder, means for supplying fluid under pressure to the brake cylinder to apply the brakes, an electric generator comprising a rotatable armature member, a rotatable field member, one of said members being rotated in accordance with the rate of rotation of a vehicle wheel, the other of said members being rotatable with the rotated member, said members being rotatable relative to each other in response to changes in the rate of rotation of the rotated member, said generator being adapted to generate a current on relative movement of its members, and means operable in response to current generated by said generator for controlling the pressure of the fluid in the brake cylinder, whereby the degree of application of the brakes is controlled in response to changes in the rate of rotation of a vehicle wheel.

18. In a vehicle control equipment, in combination, means for controlling the rate of rotation of the vehicle wheels, an electric generator comprising a rotatable field member and a rotatable armature member, one of said members being rotated in accordance with the speed of rotation of a vehicle wheel, the other of said members being rotatable with the rotated member by the magnetic attraction of the field member for the armature member and being rotatable relative to the rotated member through its inertia upon a change in the speed of rotation of the rotated member, said relative rotation of said members causing the generator to generate a current, and means responsive to the current thereby generated for controlling the means for controlling the rate of rotation of the vehicle wheels.

19. In a vehicle brake system, in combination, brake means, means for effecting an application of the brake means, an electrical differential device comprising a pair of relatively movable elements and adapted to generate a current on movement of said elements relative to each other, one of said elements being driven in accordance with the speed of a vehicle wheel, the other of said elements being movable with the first element, said second element being responsive to inertia whereby said first and second elements are movable relative to each other in response to changes in the speed of the first element, and means responsive to current supplied by said electrical differential device for controlling said brake means.

20. In a vehicle brake system, in combination, brake means, means for effecting an application of the brake means, an electric generator comprising a rotatable armature member, a rotatable field member, one of said members being rotated in accordance with the rate of rotation of a vehicle wheel, the other of said members being rotatable with the rotated member, said members being rotatable relative to each other in response to changes in the rate of rotation of the rotated member, said generator being adapted to generate a current on relative movement of its members, and means operable in response to current generated by said generator for controlling said brake means, whereby the degree of application of the brake means is controlled in response to changes in the rate of rotation of the vehicle wheels.

21. A brake equipment as described in claim 8 and characterized by means to selectively control the polarity of the current produced by the electrical differential device in response to relative rotation of its elements in a given direction.

22. A brake equipment as described in claim 8 and characterized by means to selectively control the polarity of the current supplied by the electrical differential device to the electroresponsive means in response to relative rotation of its elements in a given direction.

RANKIN J. BUSH.